(12) United States Patent
Uehara

(10) Patent No.: US 8,825,914 B2
(45) Date of Patent: Sep. 2, 2014

(54) INFORMATION PROCESSING APPARATUS, INFORMATION PROCESSING METHOD AND PROGRAM

(71) Applicant: Noriyuki Uehara, Kanagawa (JP)

(72) Inventor: Noriyuki Uehara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/915,721

(22) Filed: Jun. 12, 2013

(65) Prior Publication Data

US 2013/0346638 A1 Dec. 26, 2013

(30) Foreign Application Priority Data

Jun. 25, 2012 (JP) ................................. 2012-142270

(51) Int. Cl.
G06F 3/06 (2006.01)
G06F 13/00 (2006.01)

(52) U.S. Cl.
USPC ............. 710/10; 710/2; 710/5; 710/8; 710/15

(58) Field of Classification Search
None
See application file for complete search history.

(56) References Cited

U.S. PATENT DOCUMENTS 7,886,268 B2 2/2011 Okabe
2004/0230784 A1* 11/2004 Cohen ................................ 713/1
2008/0159059 A1* 7/2008 Moyer ........................... 365/236

FOREIGN PATENT DOCUMENTS

JP 2006-259873 9/2006
JP 2011-039745 2/2011

* cited by examiner

Primary Examiner — Scott Sun
(74) Attorney, Agent, or Firm — Harness, Dickey & Pierce, P.L.C.

(57) ABSTRACT

An information processing apparatus includes a first device initialization unit configured to perform an initialization process for recognizing one or more first devices that include a device storing an application, a second device initialization unit configured to perform an initialization process for recognizing a second device that is different from the one or more first devices, an application initialization unit configured to perform an initialization process for reading out the application from the one or more first devices and executing the application, and an initialization control unit configured to, after the initialization process by the first device initialization unit is performed, control to cause the initialization process by the application initialization unit to proceed in parallel with the initialization process by the second device initialization unit.

6 Claims, 6 Drawing Sheets

INFORMATION PROCESSING APPARATUS, INFORMATION PROCESSING METHOD AND PROGRAM

BACKGROUND OF THE INVENTION

1. Field of the Invention

The disclosures herein relate to an information processing apparatus, an information processing method and a program.

2. Description of the Related Art

Conventionally, in the case of executing programs that are stored in memory, memories that are capable of random access are used in information processing devices such as copy machines, fax machines, printers and PCs (personal computers). Typically, NOR-type flash memories are used as non-volatile memories for storing programs.

In recent times, however, program volume has enlarged due to the increased size of applications in each apparatus. As a result, in many cases, NAND-type flash memories (hereinafter referred to as NAND memories), which have a cheaper per-bit cost and a faster writing speed, are used for storing programs.

There is a necessity for devices in which programs are stored, such NAND memories, for example, to be recognized by a kernel program at an early stage of the start-up process. This is because applications are stored in the memory and application start-up processes will not proceed without first recognizing the memory.

Generally, however, in the case of carrying forward the process of recognizing devices in which programs are stored, initialization processes for other devices and ports are simultaneously executed. Because of this time is taken by the device recognition processes, and there was a need wherein was desired to quicken the startup time.

For example, Patent Document 1 discloses a technique of shortening the start-up time by preferentially starting programs that are necessary at the time of start-up.

Nevertheless, although prior art techniques preferentially process programs that are necessary at the time of startup, they do not shorten the time until the programs are read out. Thus, in the techniques of the prior art problems wherein the startup of applications are slowed have not been solved because, when recognizing devices in which programs are stored, time is taken in the devices recognition processes by the recognition of other devices as well.

It is a general object of the present invention to provide an information processing apparatus, an information processing method and a program that can shorten the time until applications start at the time the apparatus is started.

[Patent Document 1] Japanese Patent Application Publication No. 2006-259873

SUMMARY OF THE INVENTION

It is a general object of at least one embodiment of the present invention to provide an information processing apparatus that substantially obviates one or more problems caused by the limitations and disadvantages of the related art.

In one embodiment, an information processing apparatus includes a first device initialization unit configured to perform an initialization process for recognizing one or more first devices that include a device storing an application, a second device initialization unit configured to perform an initialization process for recognizing a second device that is different from the one or more first devices, an application initialization unit configured to perform an initialization process for reading out the application from the one or more first devices and executing the application, and an initialization control unit configured to, after the initialization process by the first device initialization unit is performed, control to cause the initialization process by the application initialization unit to proceed in parallel with the initialization process by the second device initialization unit.

According to the present embodiment it is possible to shorten the time until applications begin at the time when the apparatus is started.

BRIEF DESCRIPTION OF THE DRAWINGS

Other objects and further features of embodiments will be apparent from the following detailed description when read in conjunction with the accompanying drawings, in which.

DESCRIPTION OF THE PREFERRED EMBODIMENTS

In the following, embodiments of the present invention will be described with reference to the drawings.

Embodiments

<Hardware Configuration>

Figure 1:
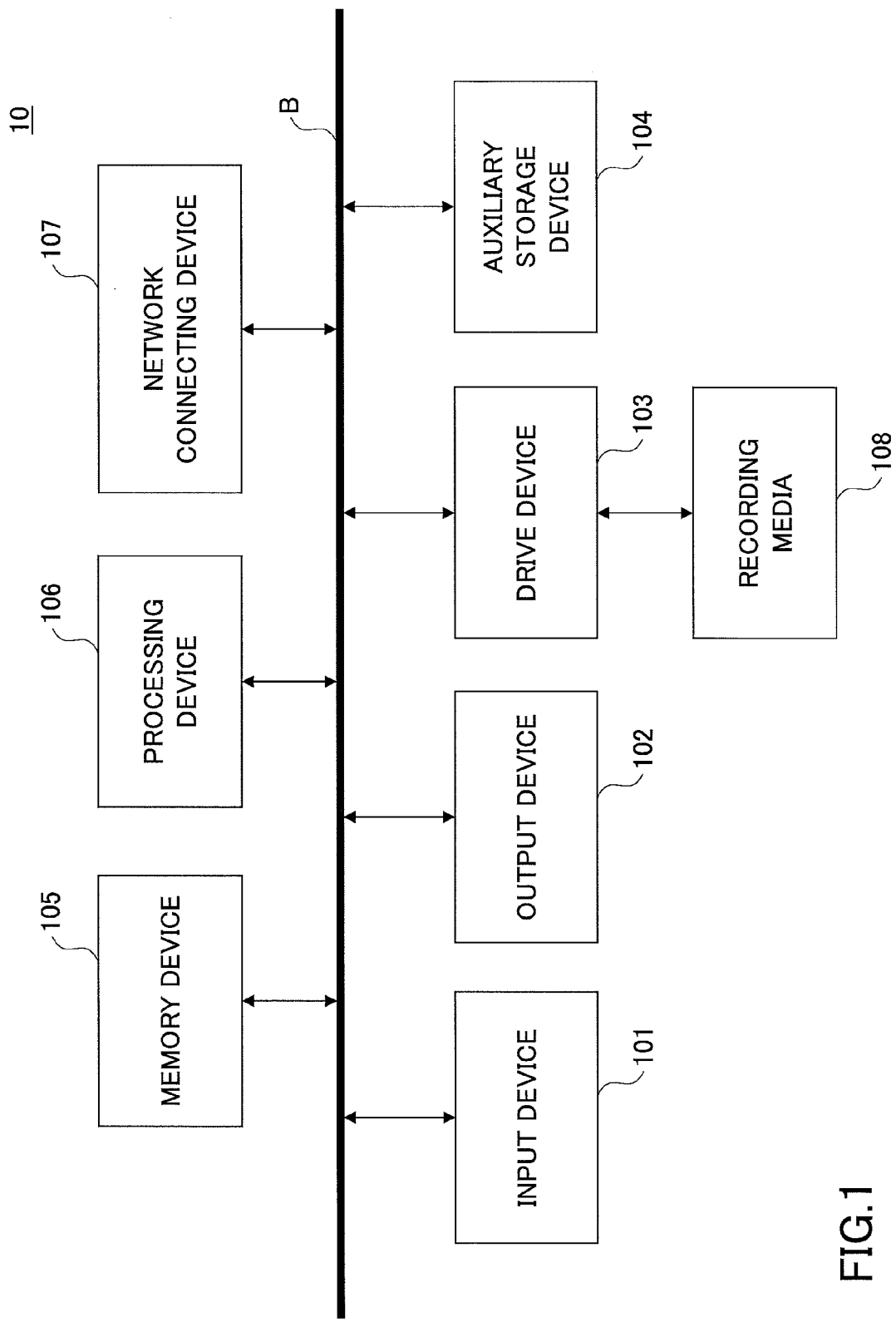
FIG. 1 is a block diagram illustrating an example of a hardware configuration of an information processing apparatus according to an embodiment of the present invention.

FIG. 1 is a block diagram illustrating an example of a hardware configuration of the information processing apparatus 10 according to the present embodiment. Note that, although the example illustrated in FIG. 1 is explained using an information processing apparatus 10 such as a PC, the invention is not limited as such; for example, it may also be an image processing apparatus such as a printer. As shown in FIG. 1, the information processing apparatus 10 has an input device 101, an output device 102, a drive device 103, an auxiliary storage device 104, a memory device 105, a processing device 106, a network connecting device 107 and a recording media 108. Each of these devices is connected to the others via a system bus B.

The input device 101 has a keyboard and a pointing device such as a mouse, which are operated by a user, or a touch screen, etc., operated by a user, and inputs application programs from a user, various application execution commands, etc., and various operation signals.

The output device 102 has a display for displaying various kinds of screens or data necessary for processing various processes, and an execution progress, execution results, etc. of the start-up program or other programs are displayed by a control program of the processing device 106.

Here, various programs that are installed in this embodiment are provided by a recording media 108 such as a CD-ROM. The recording media 108, which records various kinds of programs, can be set on the drive device 103, and executable programs included in the recording media 108 are installed into the auxiliary storage device 104 from the recording media 108 through the drive device 103.

Note that, as for the recording media 108, it is possible to use, in addition to the CD-ROM described above, various other types of recording media, for example, an optical/electrical/magnetic information recording media such as a flexible disk or a magnetic optical disk, or an electrical information recording semi-conductor memory such as a ROM (Read Only Memory) or a flash memory.

The auxiliary storage device 104 is a storage unit such as a hard disk, can store executable programs such as a start-up program of the present embodiment, control programs installed in a computer, and various kinds of data, and can input or output data as necessary.

The memory device 105 stores executable programs, such as start-up programs that are read out from the auxiliary storage device 104 by the processing device 106. And the memory device 105 includes a ROM, RAM (Random Access Memory), etc.

The processing device 106 performs various kinds of calculations and data input/output with various hardware components, based on a control program such as OS (Operating System) and executable programs such as start-up programs, stored by the memory device 105. And the processing device 106 can execute each process by controlling the overall processing of the computer. And, during executing programs, various types of necessary information can be obtained from the auxiliary storage device 104, and can be stored in the auxiliary storage device 104. The processing device 106 is, for example, a CPU (Central Processing Unit).

By connecting to a communication network, the network connecting device 107 obtains various kinds of data from other terminals that are also connected to the communication network. The network connecting device 107 can also provide other terminals with the execution results obtained by the program execution, or with executable programs themselves such as various kinds of programs of the present embodiment.

Figure 2:
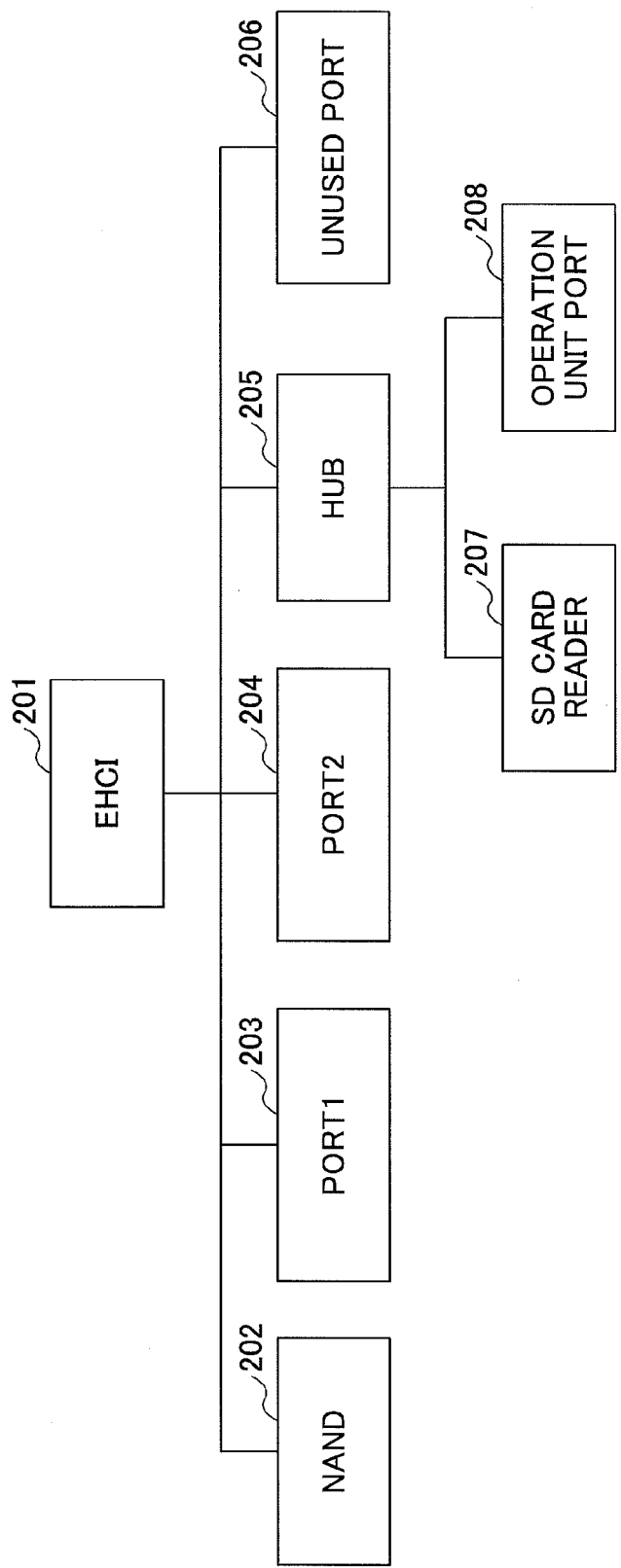
FIG. 2 is a drawing illustrating an example of a USB related device (No. 1)

FIG. 2 is a drawing illustrating an example of a USB related device (No. 1). FIG. 2 illustrates an example of a case where the information processing apparatus 10 is an MFP (Multi-Function Peripheral). The ehci (Enhanced Host Controller Interface) 201 illustrated in FIG. 2 is a USB controller that controls communication between USB connected peripheral devices and the main body of the computer. The ehci 201 corresponds to, for example, a drive device 103.

A NAND memory 202 is a device that stores applications such as copier applications and printer applications. Applications that are stored in the NAND memory 202 mean application programs. A NAND memory 202 may be mounted on the mother board, or provided as on-board.

A port1 203 and a port2 204 are USB ports and are connected to USB devices. The hub 205 is a line concentrator used in a network that takes a star-type physical topology form. An SD card reader 207 and an operation unit port 208 are connected to the hub 205.

The SD card reader 207 is a device that reads data from an SD card. The operation unit port 208 is a port for connecting an operation unit of an MFP. There is a case where an operation unit is connected by a USB connection in an MFP. The unused port 206 is a port that is not used.

In the case illustrated in FIG. 2, conventionally, an initialization process for recognizing a NAND memory 202 is performed, and then, an initialization process for recognizing each port 203 and 204, and an SD card reader 207, is performed. The initialization process is a process for connecting devices.

Accordingly, in the present embodiment, a device that stores an application is recognized first, and recognition of other devices and application initialization are performed in parallel. Application initialization is a process for making the application ready to be executed. Due to this, it is possible to shorten the time until the initialization process of an application is stared, and as a result, it is possible to shorten the start-up time of the apparatus.

<Functions>

Figure 3:
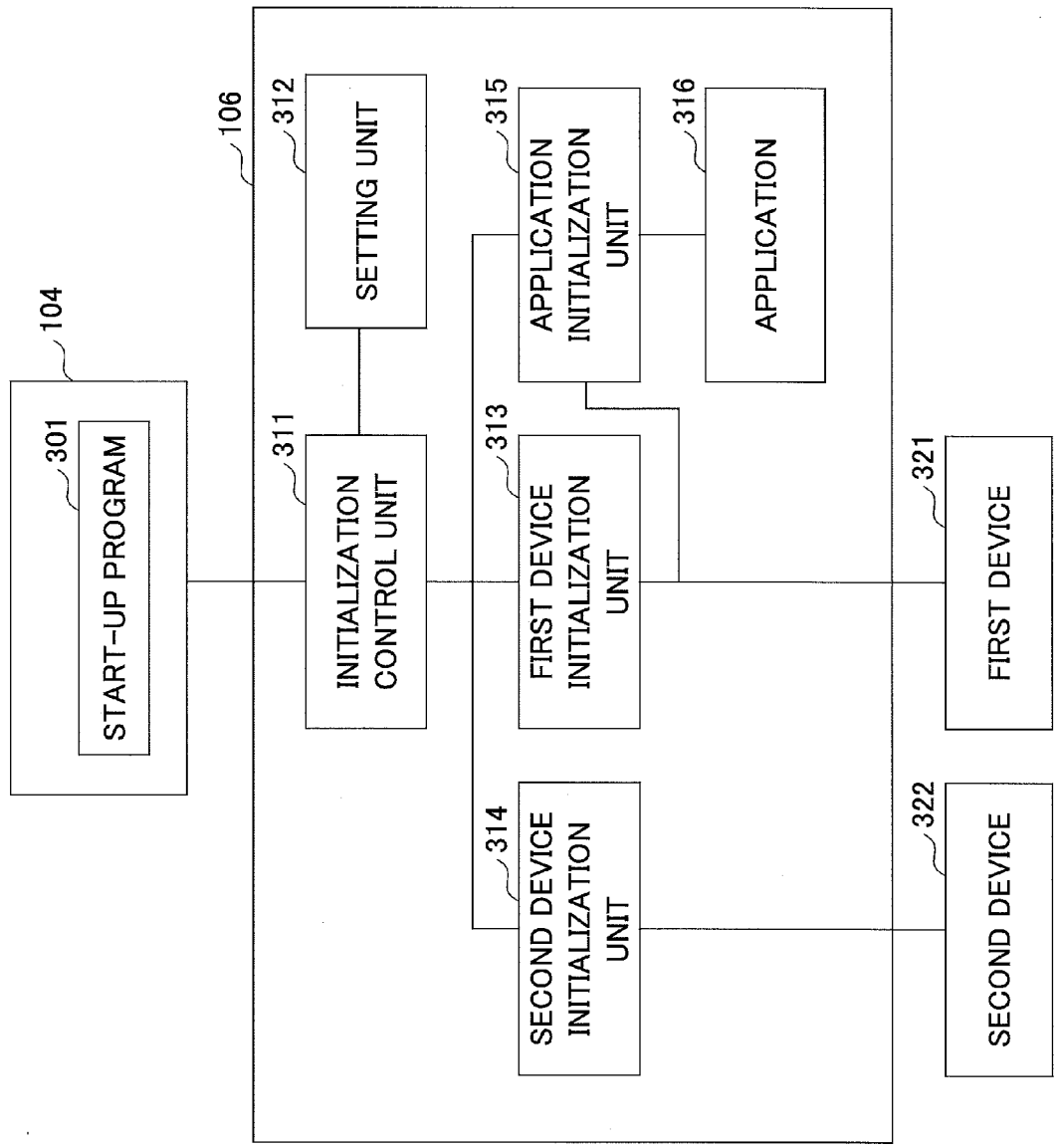
FIG. 3 is a block diagram illustrating an example of a functional configuration of the information processing apparatus, according to the present embodiment.

A functional configuration of an information processing apparatus will be described below. FIG. 3 is a block diagram illustrating an example of a functional configuration of the information processing apparatus 10, according to the present embodiment.

The first device 321 illustrated in FIG. 3 is a device that is the target of preferential recognition at the time of start-up of an apparatus. The first device 321 is, for example, a NAND memory 202 that stores an application. The second device 322 illustrated in FIG. 3 is a device that is not necessary at the start-up time of an apparatus. It is, for example, a port1 203, or a port2 204, or an SD card reader 207.

As shown in FIG. 3, an auxiliary storage device 104 stores a start-up program 301. A start-up program 301 is a program that is executed at the time an apparatus is started, recognizes devices that are connected to an apparatus, and directs initialization of the application. By the execution of the start-up program 301, an initialization process for recognizing devices and an application initialization process are performed by a processing device 106.

The processing device 106 has a initialization control unit 311, a setting unit 312, a first device initialization unit 313, a second device initialization unit 314, an application initialization unit 315 and an application 316.

The initialization control unit 311, the first device initialization unit 313, the second device initialization unit 314 and the application initialization unit 315 are implemented by, for example, a kernel that forms the core of the OS.

At the time an apparatus is started (e.g., when power supply has been turned ON), the initialization control unit 311 reads out the start-up program 301 from the auxiliary storage device 104 and executes the start-up program 301. The initialization control unit 311, first in order to identify the first device 321, references the contents set in a setting unit 312.

The setting unit 312 sets the first device 321 by kernel configuration or hard-coding, for example. By referencing the contents set by the setting unit 312, the initialization control unit 311 can identify which device connected to a port is the first device 321.

When the initialization control unit 311 identifies the first device 321, it notifies the first device initialization unit 313 of the first device 321 and instructs such that the initialization process is executed. The initialization control unit 311 notifies, for example, the port number of the port to which the first device 321 is connected.

The first device initialization unit 313 performs the initialization process for recognizing the first device 321 including a device in which the application is stored. The first device initialization unit 313 performs, as an initialization process, a process for connecting to the first device 321 in order to enable the data communication.

When the initialization process for the first device 321 is completed, the first device initialization unit 313 notifies the initialization control unit 311 of the same.

When the initialization process for the first device 321 is completed, the initialization control unit 311 alternatingly controls the initialization process of the second device initialization unit 314 and the initialization process of the application initialization unit 315, and controls such that the initialization processes are performed in parallel.

The second device initialization unit 314 performs the initialization process for recognizing the second device 322 including a device that is different from the first device. In other words, the second device initialization unit 314 performs the initialization process for a device for which preferential processing at the start-up time of the apparatus is not required.

The application initialization unit 315 reads out an application (application program) from the first device 321 and performs the initialization process of the application. The application initialization unit 315 starts-up the application program, and performs the initialization process for putting the application in a state where it is capable of being executed.

The application 316, by way of the initialization process by the application initialization unit 315 completing, becomes in a state where its services are capable of execution.

And, the initialization control unit 311, in the case where the second device initialization unit 314 goes into a waiting state, in order to stabilize the power supply, gives the CPU execution right to the application initialization unit 315. As for USB related devices, delays occur due to USB standards. Therefore, in the case where the second device initialization unit 314, during the initialization process of the second device 322, executes the delays for waiting for the power supply to become stable, the initialization control unit 311 gives the CPU execution right to the application initialization unit 315 and makes the application initialization process proceed.

The kernel described above, in the case where a hardware configuration is changed by installation of optional devices, can add to or remove from the first device 321.

Figure 4:
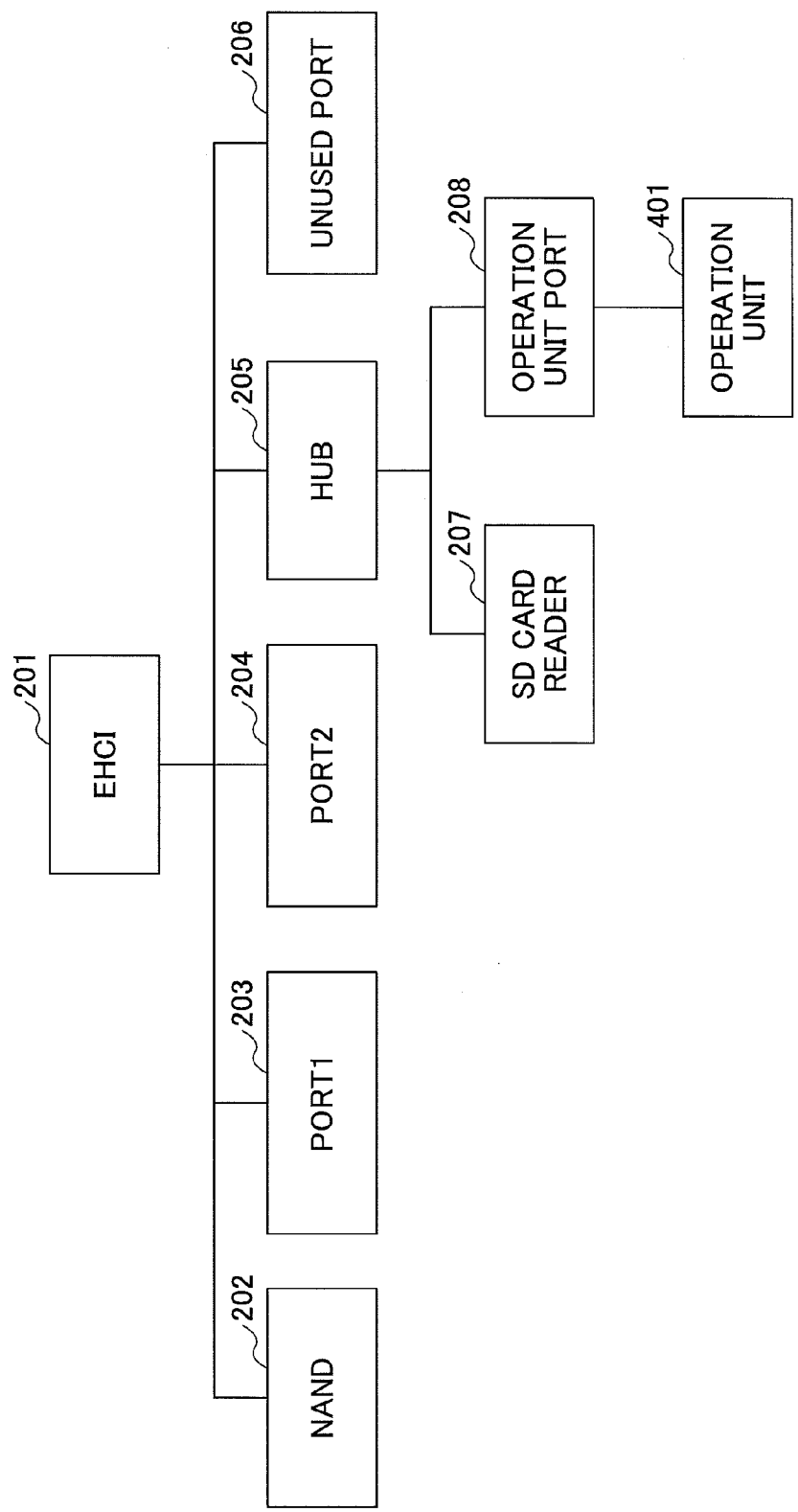
FIG. 4 is a drawing illustrating an example of a USB related device (No. 2)

FIG. 4 is a drawing illustrating an example of a USB related device (No. 2). In the example shown in FIG. 4, an operation unit 401 is connected to an operation unit port 208. In the case where the information processing apparatus is made an MFP, there are cases where, operation unit 401 of the MFP is connected by a USB connection.

Sometimes an application 316 operates its operation, based on the assumption that the initialization of the operation unit 401 has already been completed. As a result, if an initialization process of the operation unit 401 is performed in parallel with an initialization process of the application 316, a problem will occur in the process of the application 316.

Accordingly, in the case where an operation unit 401 is connected to the operation unit port 208, the first device 321 consists of three members, a NAND memory 202, a hub 205 and an operation unit 401. Although the hub 205 is not directly a necessary device at the start-up time of the apparatus, the hub 205 should become the first device 321 because the operation unit 401, which is connected at the end of the hub 205, is a necessary device at the start-up.

Newly added first device 321 (e.g. a hub 205 or an operation unit 401) is set in the contents of the setting through the kernel configuration or through the hard-coding by the setting unit 312.

As for the above example, although USB related devices of an MFP are described as an example, the same discussion applies to other information processing apparatuses, such as a PC, as long as a USB device that has stored an application is connected to the apparatus. And outside of USB related devices, the embodiment can also be applied to devices connected using SATA (Serial Advanced Technology Attachment).

SATA is an interface standard for connecting a hard disk, an SSD or an optical drive, to a computer.

<Comparison>

The related art and the present embodiment will be compared below. First, the start-up time for the related art and the start-up time for the present embodiment will be compared.

Figure 5:
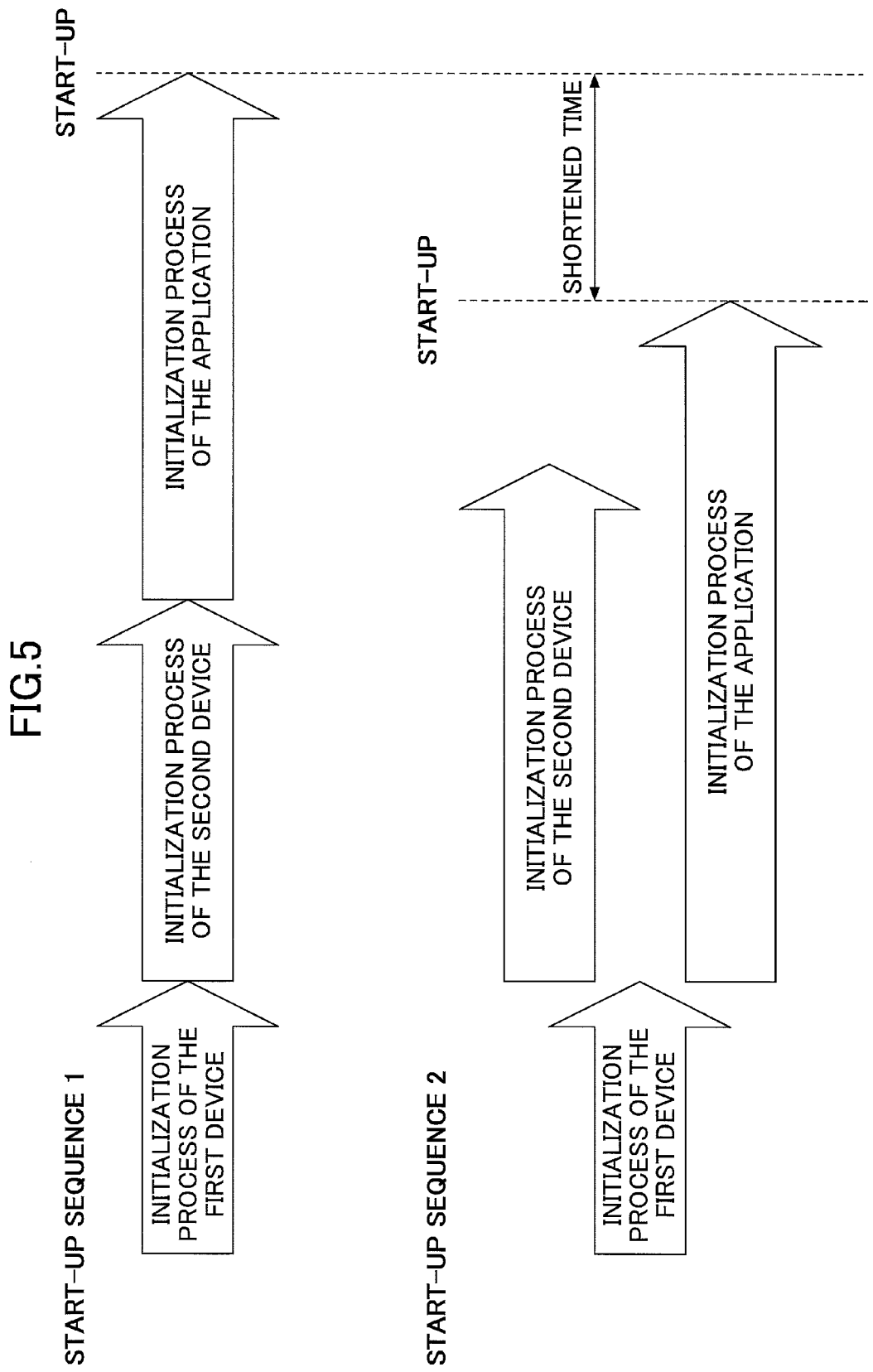
FIG. 5 is a drawing that explains the start-up time difference between the related art and the present embodiment.

FIG. 5 is a drawing that explains the start-up time difference between the related art and the present embodiment. The start-up sequence 1 in FIG. 5 illustrates the start-up sequence of the related art. In the start-up sequence 1, device initialization processes for all devices are performed first and initialization process of the application is performed next.

And as shown in FIG. 5, at the start-up time of the apparatus, the initialization process of the first device 321 is performed first. Then, the initialization process of the second device 322 is performed before the initialization process of the application is performed As for the second device 322, because waiting occurs in order to make the power supply become stable, a waste of time is generated in which the CPU does not perform processing.

On the other hand, the start-up sequence 2 in FIG. 5 illustrates the start-up sequence of the present embodiment. The initialization process of the application can be started as long as the initialization process of the first device 321, which is needed for the initialization process of the application, is completed.

Therefore, in the start-up sequence 2, after the initialization process of the first device 321 is completed, the initialization process of the application is performed in parallel with the initialization process of the second device 322 of other devices or ports.

In the case where the initialization process of other devices and the initialization process of the application are performed in parallel, each process may require a longer initialization process time compared to the case where the two processes are performed in serial, because of the execution right problem of the CPU.

But the reason why it takes time for the initialization process of the second device 322 of other devices and ports is because there is a delay for waiting for the power supply to become stable. Therefore, during the delay, there is no need for giving the CPU execution right to the initialization process of the second device 322. Thus, the CPU execution right is given to the initialization process of the application during the delay for waiting for the power supply of the second device 322 to become stable. By this, in the case where the initialization processes of the second device and the application are performed in parallel, it is possible to shorten the time until the application is started.

<Operation>

Figure 6:
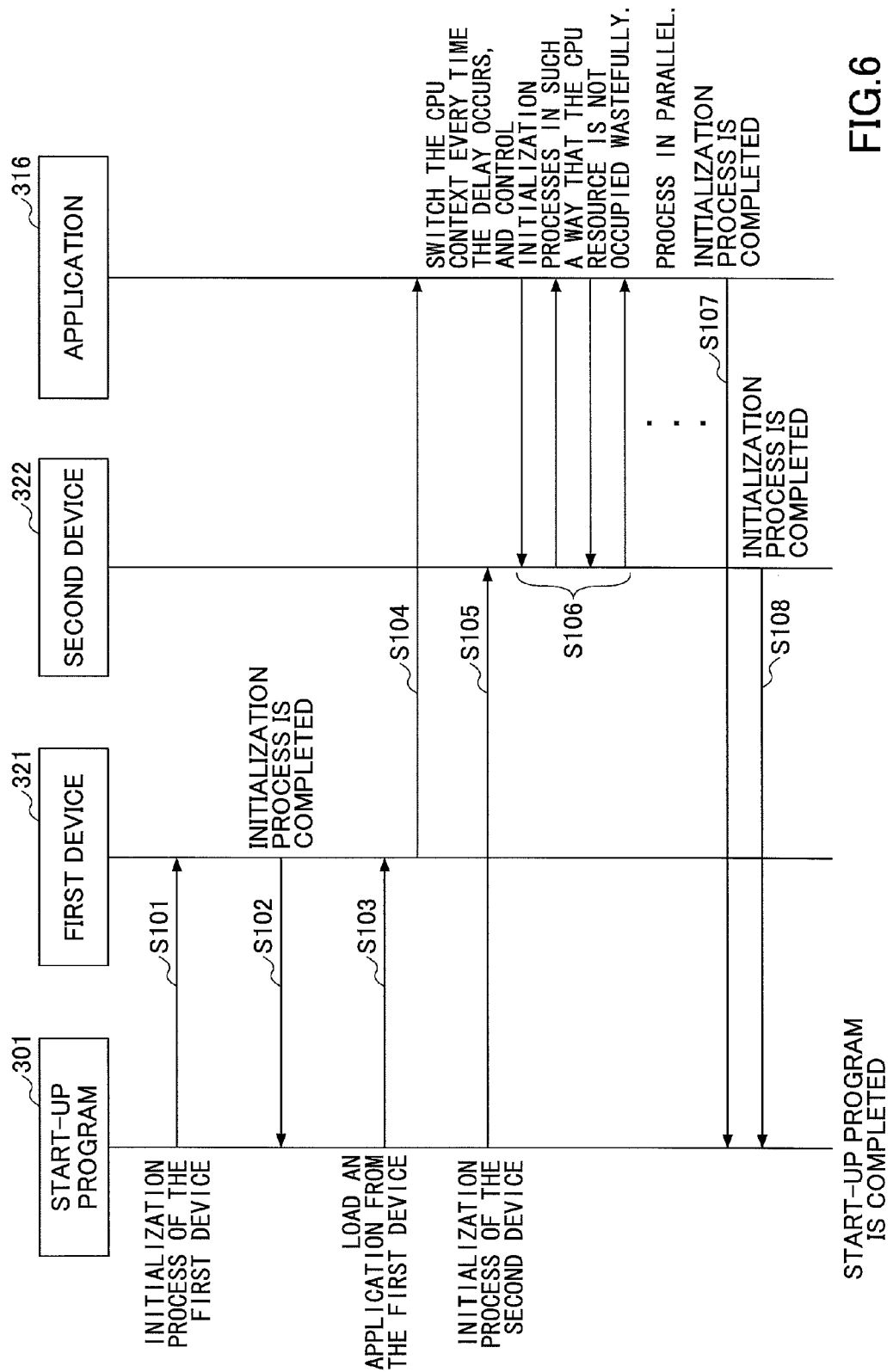
FIG. 6 is a sequence diagram illustrating an example of a start-up process of the information processing apparatus according to the present embodiment.

Operations of the information processing apparatus 10 will be described next. FIG. 6 is a sequence diagram illustrating an example of a start-up process of the information processing apparatus 10 according to the present embodiment.

In Step S101 of FIG. 6, at the time when the power supply of the information processing apparatus 10 is ON, a start-up program 301 is read in and executed by the processing device 106. By this, initialization processes of devices and initialization processes of applications are to be performed.

In step S102, when the initialization process is performed by the first device initialization unit 313 and the initialization process is completed, the first device 321 notifies the start-up program 301 of the initialization process completion.

In step S103, when the initialization process of the first device 321 is completed, the start-up program 301 executes the process of reading out (or loading) an application (or application program).

In step S104, the application (or application program) is loaded from the first device 321 and as for the application 316, the initialization process is performed by the application initialization unit 315.

In step S105, the start-up program 301 executes the initialization process of the second device 322.

In step S106, the initialization process of the application 316 and initialization process of the second device 322 are performed in parallel. The initialization control unit 311 controls the two initialization processes such as to perform switching every time the delay occurs, not to wastefully occupy the CPU resource with either of the processes.

In step S107, when the initialization process by the application initialization unit 315 is completed, the application 316 notifies the start-up program 301 of the initialization process completion.

In step S108, when the initialization process by the second device initialization unit 314 is completed, the second device 322 notifies the start-up program 301 of the initialization process completion.

When the initialization processes of the first device 321, the second device 322, and the application 316, are completed, the start-up program 301 ends its process.

According to the present embodiment above, it is possible to shorten the time until the application starts at the time the apparatus is started. And, by processing in parallel the two initialization processes of the application and the second device such as to not wastefully use the CPU resource, the start-up time of the apparatus can be shortened.

Note that the programs executed in the information processing apparatus of the present embodiment are recorded and provided on a computer readable recording media such as a CD-ROM, a Flexible Disk (FD), a CD-R, or a DVD (Digital Versatile Disk), on which the programs are recorded in an installable file format or an executable file format.

Also, the programs executed in the information processing apparatus in the present embodiment can be configured to be provided, by storing them in the computer connected to a network such as the internet, and by downloading them through the network. Also, the programs executed in the information processing apparatus in the present embodiment can be configured to be provided or distributed through a network such as the internet.

Also, the programs executed in the information processing apparatus in the present embodiment can be configured to be provided, by installing them in the ROM of the apparatus beforehand.

The programs executed in the information processing apparatus in the present embodiment are configured to be provided as modules including units described above. As for the actual hardware, by having CPU read out programs from a ROM or a HDD, and execute them, one or more units from the units described above are loaded on a RAM, and the one or more units are created on the RAM.

Note that the information processing apparatuses, information processing methods or programs described above are not limited to the configurations described above, but can be implemented having configuration elements modified without departing from the scope of the present invention at the implementation stage. Also, by combining appropriately the plurality of configuration elements disclosed in the present invention, various variations of the present invention can be formed.

The present application is based on and claims the benefit of priority of Japanese Priority Application No. 2012-142270 filed on Jun. 25, 2012, the entire contents of which are hereby incorporated by reference.

What is claimed is:

1. An information processing apparatus comprising:
a first device initialization unit configured to perform an initialization process for recognizing one or more first devices that include a device storing an application,
a second device initialization unit configured to perform an initialization process for recognizing a second device that is different from the one or more first devices,
an application initialization unit configured to perform an initialization process for reading out the application from the one or more first devices and executing the application, and
an initialization control unit configured to, after the initialization process by the first device initialization unit is performed, control to cause the initialization process by the application initialization unit to proceed in parallel with the initialization process by the second device initialization unit.

2. The information processing apparatus as claimed in claim 1, wherein the initialization control unit gives a process execution right alternatingly to the second device initialization unit and to the application initialization unit, and gives the execution right to the application initialization unit in the case where the second initialization unit goes into a state for waiting for power supply stabilization.

3. The information processing apparatus as claimed in claim 1, further comprising an operation unit, wherein the operation unit is included in the one or more first devices in the case where the operation unit of the information processing apparatus is connected to the information processing apparatus through a bus.

4. The information processing apparatus as claimed in claim 1, further comprising a setting unit configured to register the one or more first devices in configuration data, wherein the initialization control unit identifies the one or more first devices by referring to the configuration data set by the setting unit.

5. A information processing method, comprising:
a first initialization step, performed by a computer, of performing a first initialization process for identifying one or more first devices that include a device storing an application;
a second initialization step, performed by the computer, of performing a second initialization process for, after the first initialization process is performed, identifying a second device that is different from the one or more first devices; and
an application initialization step, performed by the computer, of performing an initialization process for, after the first initialization process is performed, reading out the application from the one or more first devices for executing the application, in parallel with the second initialization process.

6. A computer-readable recording medium having a program embodied therein for causing a computer to execute:
a first initialization step of performing a first initialization process for identifying one or more first devices that include a device storing an application;
a second initialization step of performing a second initialization process for, after the first initialization process is performed, identifying a second device that is different from the one or more first devices; and
an application initialization step of performing an initialization process for, after the first initialization process is performed, reading out the application from the one or more first devices for executing the application, in parallel with the second initialization process.

\* \* \* \* \*